United States Patent
Runde

(10) Patent No.: US 10,538,177 B2
(45) Date of Patent: Jan. 21, 2020

(54) POWER RETURN FOR SEAT ADJUSTER WITH EASY-ENTRY

(71) Applicant: Magna Seating Inc, Aurora (CA)

(72) Inventor: David M Runde, Beverly Hills, MI (US)

(73) Assignee: Magna Seating Inc., Aurora, Ontario ( * ) Notice: Subject to any disclaimer, the term of this patent is extended or adjusted under 35 U.S.C. 154(b) by 169 days.

(21) Appl. No.: 15/787,047

(22) Filed: Oct. 18, 2017

(65) Prior Publication Data

US 2018/0105075 A1 Apr. 19, 2018

Related U.S. Application Data

(60) Provisional application No. 62/409,640, filed on Oct. 18, 2016, provisional application No. 62/427,433, filed on Nov. 29, 2016.

(51) Int. Cl.
*B60N 2/07* (2006.01)
*B60N 2/02* (2006.01)

(52) U.S. Cl.
CPC .......... *B60N 2/07* (2013.01); *B60N 2002/024* (2013.01); *B60N 2002/0236* (2013.01)

(58) Field of Classification Search
CPC .............. B60N 2/07; B60N 2002/0236; B60N 2002/024
USPC ......................................... 297/344.1, 344.11
See application file for complete search history.

(56) References Cited

U.S. PATENT DOCUMENTS

| | | | |
|---|---|---|---|
| 5,516,071 A | 5/1996 | Miyauchi | |
| 6,986,493 B2* | 1/2006 | Yokota | B60N 2/0232 248/424 |
| 7,500,719 B2 | 3/2009 | Kojima | |
| 9,156,377 B2 | 10/2015 | Mixon et al. | |
| 9,415,705 B2 | 1/2016 | Mixon et al. | |
| 9,233,627 B2 | 6/2016 | Michalak et al. | |
| 2003/0075963 A1 | 4/2003 | Oberbeck | |
| 2004/0164218 A1* | 8/2004 | Yokota | B60N 2/0232 248/430 |
| 2004/0222348 A1* | 11/2004 | Yokota | B60N 2/0232 248/429 |
| 2005/0082890 A1* | 4/2005 | Taubmann | B60J 7/0573 297/344.1 |
| 2007/0013218 A1* | 1/2007 | Kayumi | B60N 2/0232 297/344.1 |
| 2007/0120407 A1* | 5/2007 | Kojima | B60N 2/0705 297/344.11 |

(Continued)

*Primary Examiner* — Mark R Wendell
(74) *Attorney, Agent, or Firm* — Miller Canfield

(57) ABSTRACT

A power return mechanism for restoring a seat track assembly for a vehicle from a first position, such as a full forward position used for easy-entry, to a second position, such as a passenger use position. The power return mechanism includes a return cable assembly with a return cable adapted to be fixedly secured to one of the upper or lower rails of the seat track assembly, and a selectively actuated cable draw assembly. The cable draw assembly is adapted to be connected to the other of the upper or lower rails of the seat track assembly. The cable draw assembly permits free movement of the return cable when the cable draw assembly is inactive. When actuated, the cable draw assembly draws in the return cable, thereby moving the upper rail of the seat track assembly from the first position to the second position.

18 Claims, 16 Drawing Sheets

(56) References Cited

U.S. PATENT DOCUMENTS

| | | | | |
|---|---|---|---|---|
| 2008/0023613 A1* | 1/2008 | Brewer | ............... | B60N 2/0232 |
| | | | | 248/429 |
| 2008/0197654 A1* | 8/2008 | Livesey | ............... | B60N 2/067 |
| | | | | 296/65.13 |
| 2008/0252126 A1 | 10/2008 | Bartoi et al. | | |
| 2011/0298264 A1* | 12/2011 | Ito | ..................... | B60N 2/0705 |
| | | | | 297/341 |
| 2012/0280104 A1* | 11/2012 | Veen | .................. | B60N 2/0232 |
| | | | | 248/671 |
| 2014/0183917 A1* | 7/2014 | Becker | ................. | B60N 2/123 |
| | | | | 297/344.1 |
| 2015/0151650 A1* | 6/2015 | Kim | .................... | B60N 2/0705 |
| | | | | 248/429 |
| 2015/0314710 A1* | 11/2015 | Mixon | ............... | B60N 2/2227 |
| | | | | 297/344.1 |
| 2017/0225592 A1* | 8/2017 | Ferre | ................... | B60N 2/0228 |
| 2018/0215288 A1* | 8/2018 | Hiemstra | ............... | B60N 2/20 |

* cited by examiner

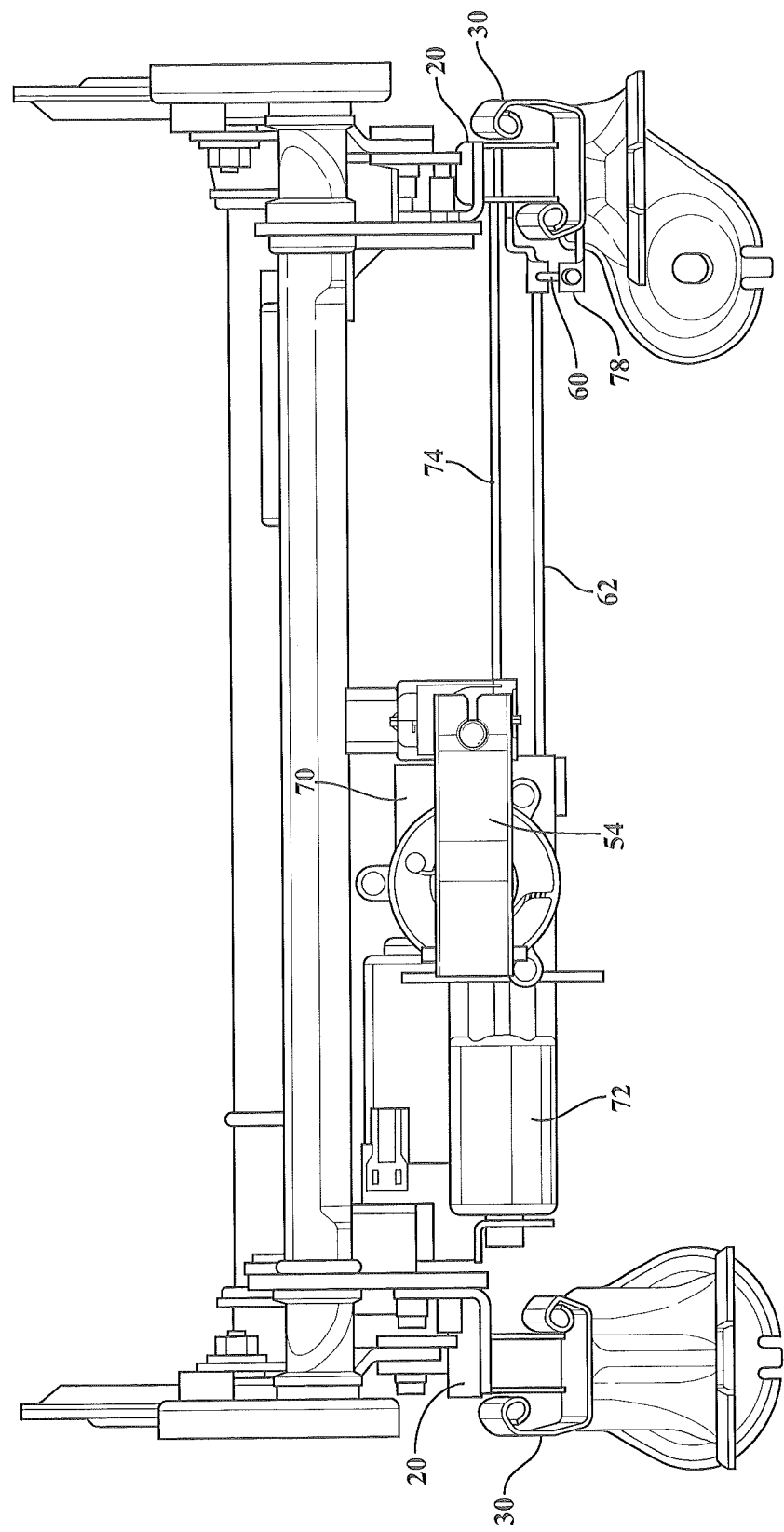

POWER RETURN FOR SEAT ADJUSTER
WITH EASY-ENTRY

CROSS-REFERENCE TO RELATED
APPLICATION

This application claims priority to and all the benefits of U.S. Provisional Application No. 62/409,640, filed on Oct. 18, 2016 and U.S. Provisional Application No. 62/427,433, filed on Nov. 29, 2016, the contents of which are incorporated by reference.

BACKGROUND OF THE INVENTION

1. Field of the Invention

The present disclosure relates to a vehicle seat assembly adapted to be mounted to a vehicle floor by a track assembly wherein an easy-entry track mechanism allows the seat assembly to slide fore and aft along the track assembly between a passenger use position and a full forward position. Specifically, the disclosure relates to a powered return mechanism for returning or restoring the vehicle seat assembly to a passenger use position.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is also typically pivotally coupled to the seat cushion by a recliner mechanism for providing pivotal movement between an upright seating position, a plurality of reclined positions, and a forwardly dumped position at least partially overlying the seat cushion.

The seat track assembly provides sliding fore and aft movement of the seat assembly between a plurality of use positions, and a full forward, or easy-entry, position. It is known to actuate one or more release mechanisms to enable pivotal movement of the seat back to the forwardly dumped position and forward sliding of the seat assembly to the full forward position to allow easy ingress and egress within the vehicle behind the seat assembly.

It is desirable to provide a powered return mechanism which returns the seat assembly from a forward position, including the full forward or easy-entry position, to a passenger use position.

SUMMARY OF THE INVENTION

According to one aspect of the disclosure, there is provided a power return mechanism for restoring an upper rail of a seat track assembly for a vehicle from a first position to a second position relative to a lower rail of the seat track assembly, the upper rail being slidably coupled with the lower rail. The power return mechanism includes a return cable assembly having a return cable adapted to be fixedly secured to one of the upper rail or the lower rail of the seat track assembly; and a selectively actuated cable draw assembly adapted to be connected to the other of the upper rail or the lower rail of the seat track assembly and operatively coupled with the return cable assembly, the cable draw assembly permitting free movement of the return cable when the cable draw assembly is inactive, and when actuated, the cable draw assembly draws in the return cable, thereby moving the upper rail of the seat track assembly from the first position to the second position. The first position may be a forward or full forward position of the seat assembly and the second position is an aft or rearward position, such as a passenger use position.

In some embodiments, the cable draw assembly includes a support shaft having a longitudinal axis; a drive member coaxial with the support shaft and rotatably mounted to a proximal end of the support shaft; a torque member coaxial with and rotatably mounted to the support shaft, the torque member being mounted adjacent to the drive member; and a return cable drum coaxial with and rotatably mounted to the torque member, the return cable drum holding and guiding the return cable of the return cable assembly. When the cable draw assembly is actuated, the torque member engages and rotates with the drive member, thereby causing the return cable drum to rotate and draw in the return cable.

In some embodiments, the cable draw assembly includes a torque limiter between the drive member and the return cable drum. The torque limiter permits rotation of the return cable drum to stop as tension on the return cable overcomes friction forces on the return cable drum.

BRIEF DESCRIPTION OF THE DRAWINGS

The present disclosure will be readily appreciated as the same becomes better understood by reference to the following detailed description when considered in connection with the accompanying drawings wherein:

FIG. 2 is a front view of the seat track assembly and power return mechanism;

DETAILED DESCRIPTION OF THE PREFERRED EMBODIMENTS

Figure 1:
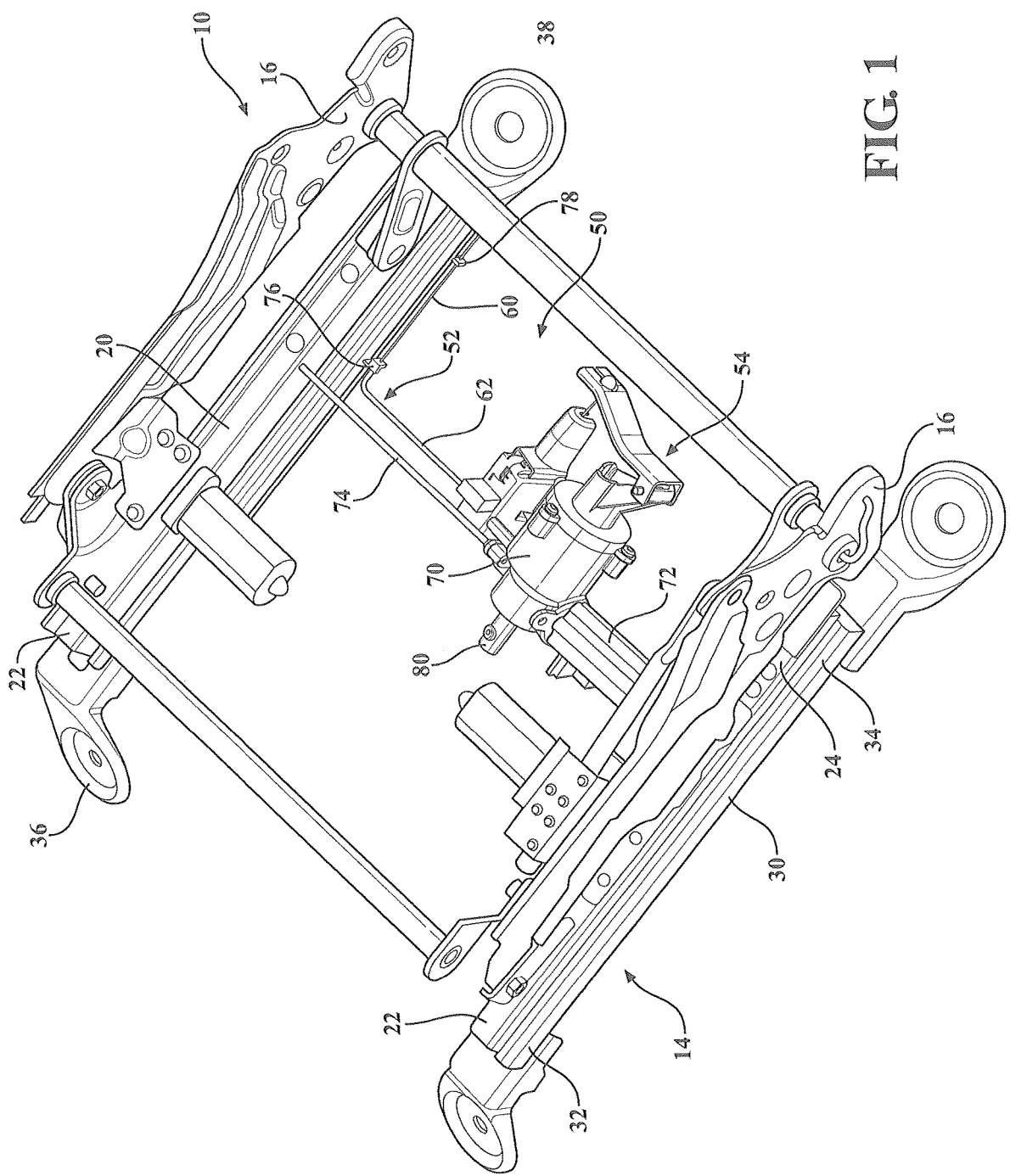
FIG. 1 is a perspective view of a seat track assembly for slidably mounting a seat assembly to a vehicle and a power return mechanism according to one embodiment of the present disclosure.

Referring to the Figures, wherein like numerals indicate like or corresponding parts throughout the several views, a portion of a seat assembly for use in an automotive vehicle is generally shown at 10. The seat assembly 10 includes a generally horizontal seat cushion (not shown) and a generally upright seat back (not shown) operatively coupled to the seat cushion. The seat assembly 10 is adapted to be mounted to a vehicle floor by a seat track assembly 14 for providing fore and aft adjustment of the seat assembly 10. The seat cushion includes a pair of spaced apart seat cushion brackets 16 fixedly secured to the seat track assembly 14. The seat back includes a corresponding pair of spaced apart seat back brackets (not shown) operatively coupled to respective seat cushion brackets 16 by a recliner mechanism (not shown). The recliner mechanism provides pivotal movement of the seat back between an upright seating position, a plurality of reclined positions, and a forwardly dumped position at least partially overlying the seat cushion, as is commonly known to one skilled in the art. A recliner release mechanism (not shown) may be operatively coupled to the recliner mechanism for selectively unlocking each recliner mechanism. The recliner release mechanism may be any type known in the art for selectively actuating the recliner mechanisms between a locked condition and an unlocked condition allowing pivotal movement of the seat back.

The seat track assembly 14 provides selective fore and aft sliding adjustment of the seat assembly 10 along the vehicle floor. The seat track assembly 14 includes a pair of spaced apart and parallel upper rails 20 extending between opposite forward and rearward ends 22, 24 and slidably coupled to a corresponding pair of spaced apart and parallel lower rails 30 extending between corresponding forward and rearward ends 32, 34. The seat cushion brackets 16 are fixedly secured to the upper rails 20. The lower rails 30 are fixedly secured to the vehicle floor by mounting brackets 36, 38. A seat rail locking mechanism (not shown) of any type commonly known in the art is operatively coupled between each of the upper rails 20 and lower rails 30 for selective actuation between a locked condition and an unlocked condition allowing fore and aft sliding movement of the upper rails 20 relative to the lower rails 30.

The seat assembly 10 may further include an easy-entry release mechanism (not shown) operatively coupled to the seat track assembly 14 for allowing sliding movement of the seat assembly 10 between a passenger use position and a full forward, or easy-entry, position. The easy-entry release mechanism may be actuated at the same time as the recliner release mechanism in order to move the seat assembly 10 to the full forward and forwardly dumped position. Alternatively, the easy-entry release mechanism may be actuated in response to pivotal movement of the seat back to the forwardly dumped position. The pivotal movement of the seat back and the fore and aft movement of the seat cushion, including movement of the seat back and seat cushion into the easy-entry position, may be powered or achieved manually.

The seat assembly 10 of the present disclosure includes a power return mechanism 50. During regular operations of the seat assembly, the power return mechanism is not engaged or actuated but it permits fore and aft sliding movement of the seat assembly 10 including the sliding of the seat assembly 10 to the full forward position. Once the power return mechanism 50 is actuated, as described herein, it operates to pull the upper rails 20 of the seat track assembly 14 rearward to the passenger use position. The power return mechanism 50 may be actuated to return the seat assembly from any position forward of the power return mechanism 50, including the full forward position, back to the passenger use position.

In one embodiment, the power return mechanism 50 consists of a return cable assembly 52 and a cable draw assembly 54. The return cable assembly 52 has a return cable 60 which extends from the cable draw assembly 54 through a conduit 62. As the seat assembly 10 slides forward and rearward for adjustment of its fore and aft position, the return cable 60 moves freely within the conduit 62 and the power return mechanism 50. The return cable 60 is attached to one of the upper and lower rails 20, 30. The cable draw assembly 54 is coupled to the other of the upper and lower rails 20, 30. For example, if the return cable 60 is attached to the upper rail 20, the cable draw assembly 54 is mounted and secured to one or both of the lower rails 30 at a position rearward or behind the attachment of the return cable 60 to the upper rail 20. When the power return mechanism 50 is actuated, the cable draw assembly 54 remains stationary and pulls or draws in the return cable 60, thus drawing the upper rail 20, and the seat assembly attached thereto, rearward along the lower rail 30.

If the return cable 60 is attached to the lower rail, the cable draw assembly 54 may be connected to one or both of the upper rails 20. In this embodiment, the cable draw assembly 54 is mounted to the seat track assembly at a position forward of the attachment of the return cable 60 to the lower rail 30. When the power return mechanism 50 is actuated, the cable draw assembly 54 pulls or draws in the return cable 60, thus drawing the cable draw assembly 54, the upper rails 20, and the seat assembly attached thereto, rearward along the lower rails 30. The cable draw assembly 54 may be directly mounted to one or both of the upper rails 20. Alternatively, the cable draw assembly 54 may be mounted to one or both seat cushion brackets 16, or other components of the seat assembly 10 or seat track assembly 14 which are connected to one or both upper rails 20.

The power return mechanism 50 illustrated in FIGS. 1-3B includes the cable draw assembly 54 connected to both upper rails 20. Specifically, the cable draw assembly 54 includes a housing 70 which is connected to a motor assembly 72 on one side of the seat track assembly 14. A support rod 74 connects and supports the housing 70 to the upper rail 20 on the opposing side of the seat track assembly 14. The motor assembly 72 is configured to drive the cable draw assembly 54. The motor assembly 72 may be dedicated for use with the power return mechanism 50 or the motor assembly 72 may be a multi-purpose assembly also used to drive other mechanisms of the seat assembly 10. In this embodiment, the conduit 62 extends from the cable draw assembly 54 and is secured to the upper rail 20 at a first attachment point 76. The return cable 60 extends from the conduit 62 and is secured to the lower rail 30 at a second attachment point 78. The second attachment point 78 is rearward of the first attachment 76 point and the power return mechanism 50.

As illustrated in FIGS. 3A-5, in one embodiment, the cable draw assembly 54 has a longitudinal support shaft 80. A proximal end of the support shaft 80 may be press fit or over molded onto a rear portion of the housing 70. Adjacent the proximal end, the support shaft 80 supports a drive member 82 which is rotatable about and coaxial with the support shaft 80. The drive member 82 is operatively coupled to a drive assembly 84. The drive assembly 84 comprises a drive shaft 86 adapted to be coupled to the motor assembly 72. In one embodiment, the drive assembly 84 comprises the drive shaft 86 and the motor assembly 72. The drive member 82 may be mounted to the support shaft 80 in a fixed lateral position. In one embodiment, the drive member 82 comprises a worm gear and the drive shaft 86 comprises a worm shaft. In one embodiment, the drive member 82 includes a first geared portion 90 at its proximal end, adjacent the drive assembly 84 and a second flanged portion 92 at a distal end of the drive member 82. A bearing 96, such as a ball or nylon bearing may be located between the support shaft 80 and the proximal end of the drive member 82.

The support shaft 80 also supports a torque member 100 adjacent the flanged portion 92 of the drive member 82. The torque member 100 is rotatably mounted to and coaxial with the support shaft 80. As described below, when the power return mechanism 50 is actuated, the torque member 100 moves axially towards the proximal end of the support shaft 80 to engage the drive member 82. A return bias means 102, is provided to push the torque member 100 axially along the support shaft 80 away from the drive member 82 when the power return mechanism 50 is deactivated. The torque member 100 includes a longitudinal portion 104 and an annular surface or plate 106 extending outward from the torque member 100 transverse to the longitudinal axis of the support shaft 80. In one embodiment, the plate 106 extends from the middle of the longitudinal portion 104.

In one embodiment, the drive member 82 has a first set of teeth (not shown) on a surface of the flanged portion which engage with a corresponding set of teeth (not shown) on a facing surface of the torque member 100. The teeth are engaged when the power return mechanism 50 is actuated to cause the torque member 100 to rotate with the drive member 82. The outer circumference of the flanged portion 92 of the driver member 82 is larger than the outer circumference of the adjacent portion of the torque member 100. Thus, in one embodiment, the flanged portion 92 of the drive member 82 may define a cavity for receiving a portion of the torque member 100 when the power return mechanism 50 is activated. Fingers or teeth may extend within the cavity of the drive member 82 for mating with corresponding mating fingers, teeth, depressions or notches defined in the corresponding mating surface of the torque member 100.

The return bias means 102 prevents the torque member 100 from engaging and rotating with the drive member 82 when the power return mechanism 50 is not actuated. For example, in one embodiment with the cable draw assembly 54 sharing a motor assembly 72 or drive source with other powered functions of the seat assembly 10, the drive member 82 rotates about the support shaft 80 during other regular power seat functions since the drive member 82 remains connected to the drive assembly 84. The return bias means 102 ensures that during these other powered operations of the seat assembly 10, the torque member 100 and drive member 82 are not engaged. The return bias means 102 may be any suitable bias means such as a clock spring or expansion spring.

A return cable drum 110 is mounted to and coaxial with the torque member 100. In one embodiment, the return cable drum 110 is mounted to the torque member 100 adjacent to the plate 106 and specifically, on the side of the plate 106 facing the drive member 82. The return cable drum 110 houses and retains the return cable 60. During regular operation of the seat assembly 10, the return cable drum 110 rotates freely and independently of the torque member 100 and drive member 82. The return cable 60 pays out during forward seat travel and is pulled back in during rearward seat travel due to a cable tension means 114. The cable tension means 114 is connected to return cable drum 110 and to an inner portion of the housing 70 of the cable draw assembly 54. The cable tension means 114 may be any suitable bias means such as a clock spring or expansion spring.

Figure 4:
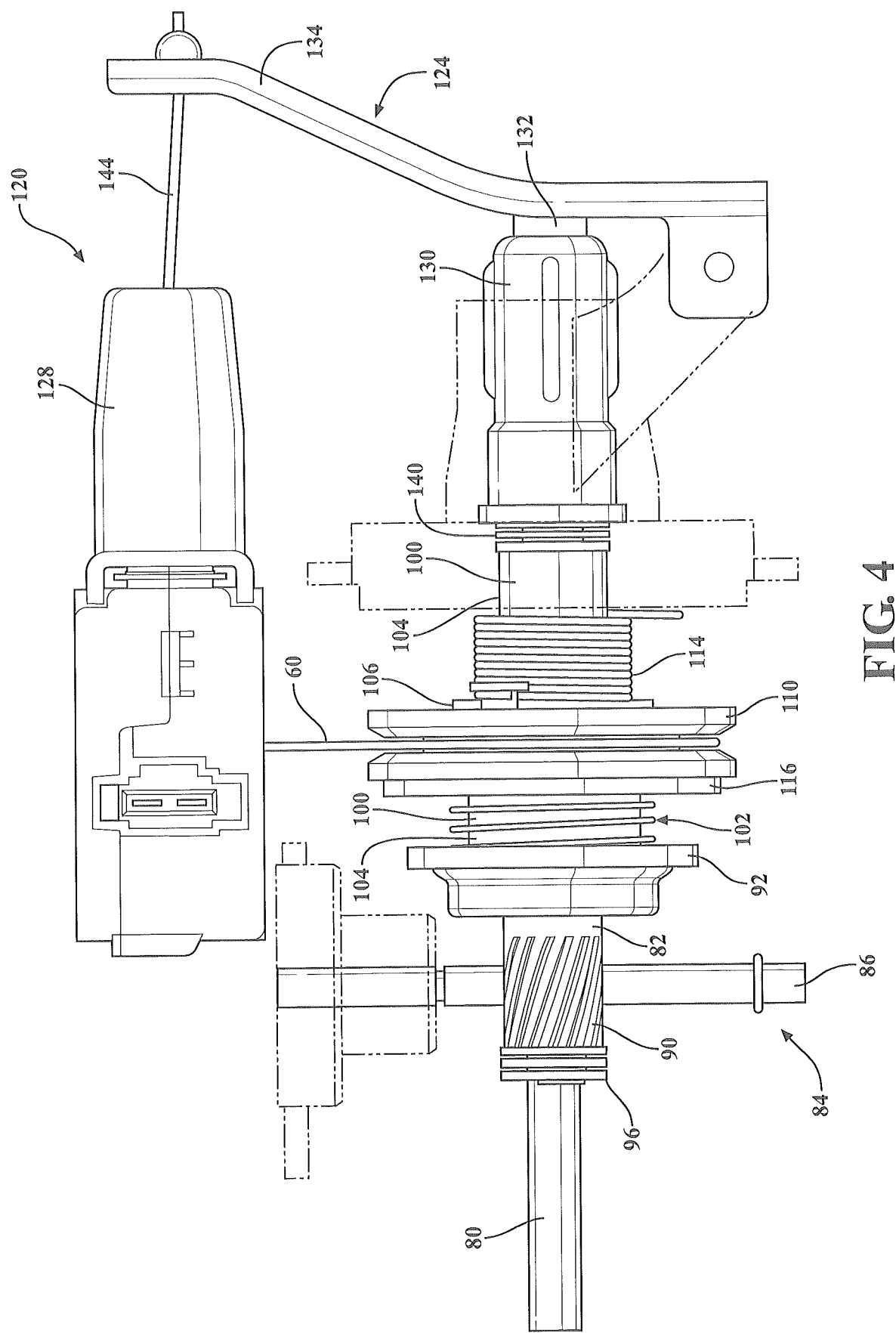
FIG. 4 is a top view of the cable draw assembly in a first position with portions of the housing removed or shown in phantom lines.
Figure 5:
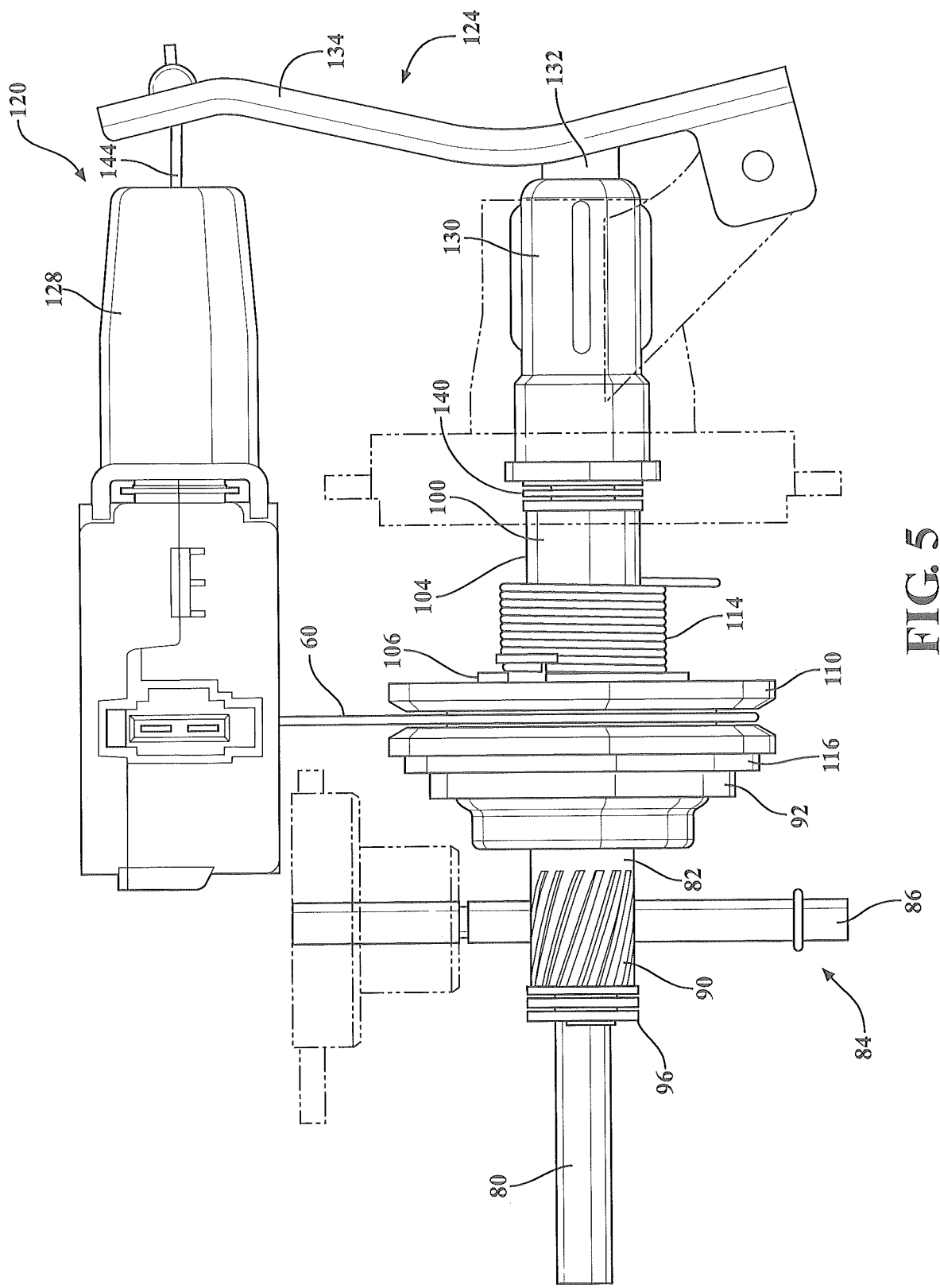
FIG. 5 is a top view of the cable draw assembly in a second position with portions of the housing removed or shown in phantom lines.

As seen in FIGS. 4 and 5, the outer circumference of the flanged portion 92 of the drive member 82 is larger than the outer circumference of the adjacent portion of the torque member 100 such that the return cable drum 110 contacts the flanged portion 92 of the drive member 82 when the power return mechanism 50 is actuated. This contact may be made to rotate the return cable drum 110 and draw in the return cable 60, thus moving the upper rail 20 and seat assembly 10 back to the passenger use position. In one embodiment, to avoid having the return cable drum 110 continue to rotate, or continue to attempt to rotate, after the seat assembly 10 has hit a hard stop, the cable draw assembly 54 includes a torque limiter to reduce or eliminate the rotational force applied by the drive member 82, as described in further detail below. In one embodiment, the torque limiter comprises a friction pad 116 mounted to the torque member 100.

Figure 3A:
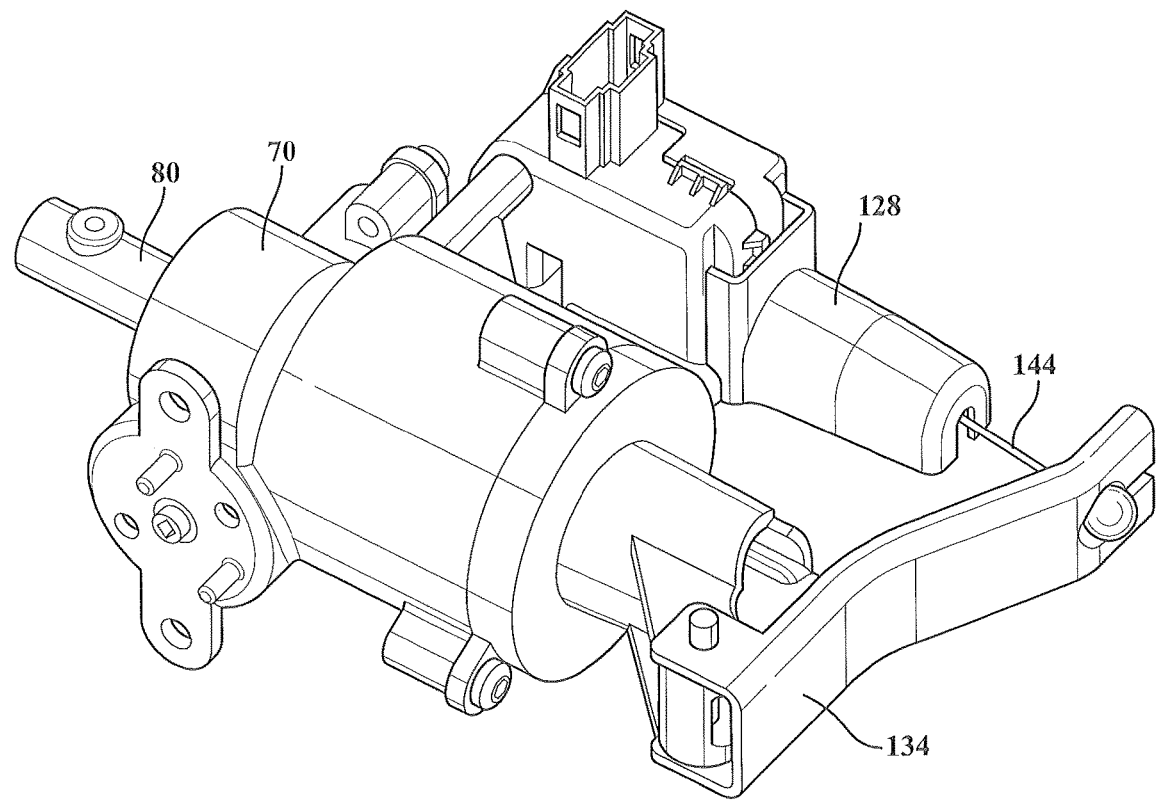
FIG. 3A is a top perspective view of a cable draw assembly for the power return mechanism and FIG. 3B is a bottom view of the cable draw assembly.
Figure 3B:
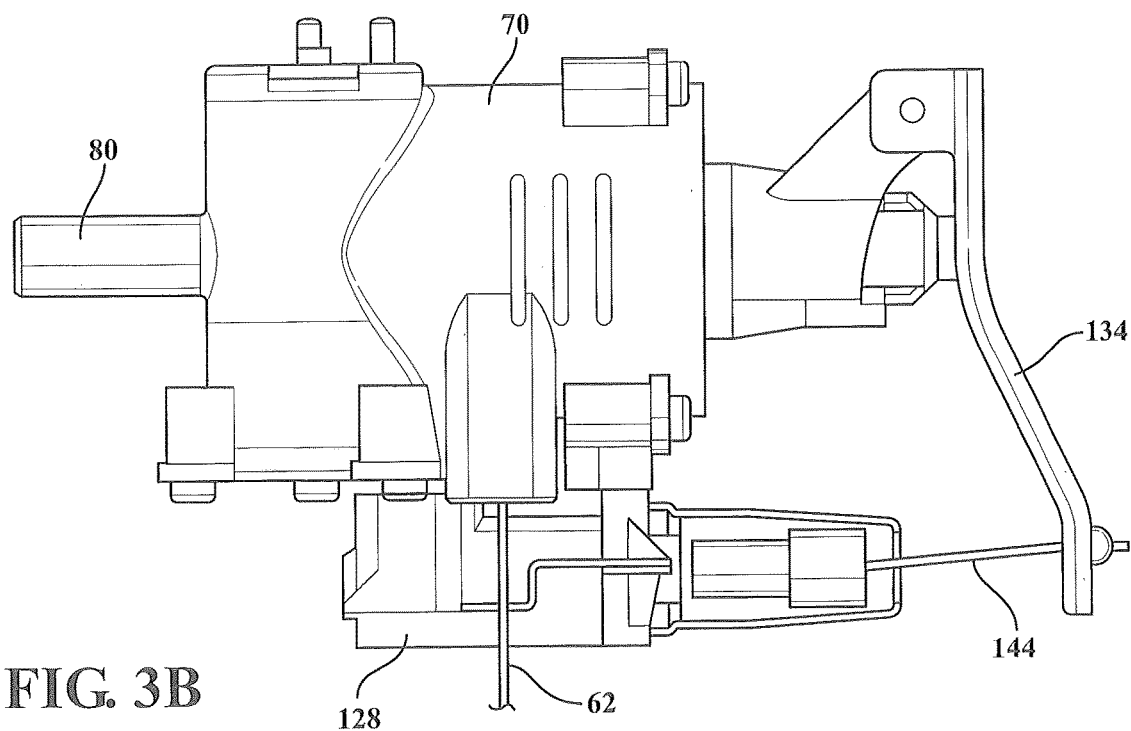

An actuator assembly 120 and the inactive and actuated states of the cable draw assembly 54 are illustrated in FIGS. 4 and 5. In one embodiment, the actuator assembly includes a first actuator 124 and a second actuator 128. The first actuator 124 is mounted adjacent the torque member 100 at a second or distal end of the support shaft 80. In one embodiment, the first actuator 124 is a mechanical actuator which includes a cap 130, a bumper 132 and a lever 134 as shown. The lever 134 has a first end adjacent the second actuator 128 and a second end adjacent the bumper 132 and cap 130. A bearing 140, such as a ball or nylon bearing may be located between the cap 130 and the distal end of the torque member 100. The first actuator 124 is controlled by the second actuator 128. In one embodiment, the second actuator 128 is a powered actuator which may be powered by the motor assembly 72. The second actuator 128 is connected to and controlled by a user input (not shown), such as a button provided for activating the power return mechanism 50. The second actuator 128 also may be connected to and controlled by the seat rail locking mechanism for deactivation of the power return mechanism 50. In one embodiment, the second actuator 128 includes an actuator cable 144 which connects to the first end of the lever 134 of the first actuator 124. As shown in FIGS. 3A and 3B, the second actuator 128 may be mounted to the housing 70 of the cable draw assembly 54. In this embodiment, the return cable assembly 52 extends from an aperture in the housing 70 below the second actuator 128. In one embodiment, the aperture is a slot (not shown).

Upon actuation by the user of the power return mechanism 50, the second actuator 128 draws in the actuator cable 144 which pulls the lever 134 towards the second actuator 128. As a result, the second end of the lever 134 presses on the actuator bumper 132 and cap 130, thereby driving the components mounted on the support shaft 80 towards the drive member 82. Specifically, as the torque member 100 moves towards the drive member 82, the plate 106 of the torque member 100 also pushes the return cable drum 110 towards the drive member 82. The torque member 100 translates axially toward the proximal end of the support shaft 80 and moves a distance sufficient for the torque member 100 to engage with the drive member 82. At this point, the torque member 100 rotates with the drive member 82.

The return cable drum 110 remains independent of the drive member 82 and torque member 100 but rotates with these two components during actuation of the power return mechanism 50 due to the frictional force caused by the lateral translation of the torque member 100 towards the drive member 82. The return cable drum 110 thus rotates and retracts the return cable 60, thereby pulling the cable draw assembly 54, and the upper rails 20 to which it is connected, rearward to the passenger use position. The return cable drum 110 is pressed between the plate 106 of the torque member 100 and the drive member 82. In one embodiment, a torque limiter such as the friction pad 116 separates the return cable drum 110 from the flanged portion 92 of the drive member 82. Although the return cable drum 110 is pressed between the drive member 82 and torque member 100, the return cable drum 110 is prevented from rotating or attempting to rotate further when this frictional force is overcome by increased force or tension in the return cable 60 resulting from a hard stop. The hard stop may be due to the seat assembly 10 reaching the passenger use position or an obstruction blocking the movement of the seat.

Figure 6:
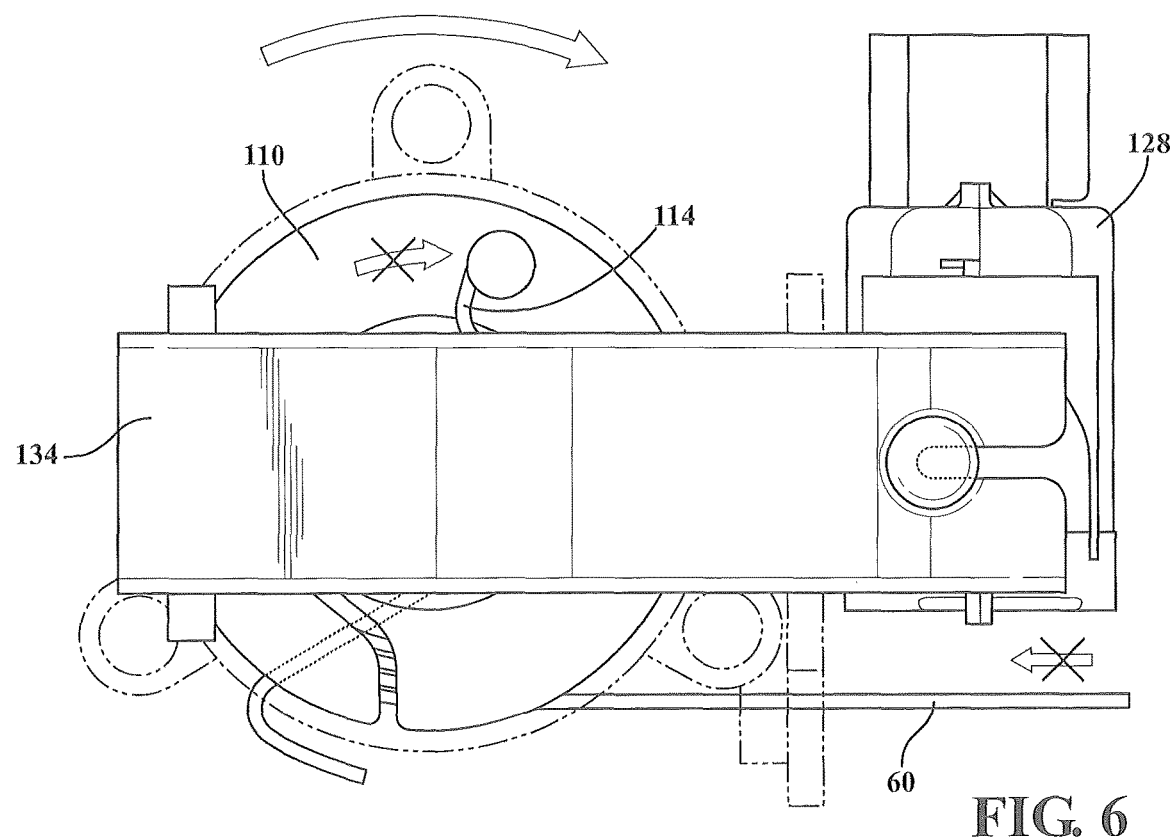
FIG. 6 is a front view of the cable draw assembly of FIG. 5.

When the upper rails 20 of the seat track assembly hit this hard stop, the drive member 82 and torque member 100 continue to rotate but as represented in FIG. 6, the return cable drum 110 slips against the friction pad 116 until the seat is locked and the power return mechanism 50 is deactivated. This protects the cable draw assembly 54 from continuously pulling the return cable 60 even after the seat assembly 10 has stopped travelling along the lower rails 30 of the seat track assembly 14. At the same time, tension is retained in the return cable 60 to ensure that the seat assembly 10 is locked into the passenger use position by the seat rail locking mechanism before the power return mechanism 50 is deactivated. This delay, on the order of a second or less than a second, accounts for tolerances in the seat assembly 10 and ensures that the seat assembly 10 is locked into position. Otherwise, if the power return mechanism 50 is deactivated as soon as the movement of the upper rails 20 stops, slack in the return cable 60 may prevent the seat assembly 10 from properly latching and locking into position.

Once the seat assembly is locked into position, the power return mechanism 50 is deactivated. In one embodiment, the seat rail locking mechanism signals the second actuator 128 to deactivate after the seat assembly 10 is locked into position. In another embodiment, this deactivation is achieved by the seat rail locking mechanism shutting off power from the motor assembly 72 to the cable draw assembly 54 and the second actuator 128. Once the power return mechanism 50 is deactivated, the second actuator 128 releases the actuator cable 144. The lever 134 of the first actuator 124 moves back to its return or normal pre-activated position thus releasing the force applied by the first actuator 124 to the torque member 100. The return bias means 102 forces lateral movement of the torque member 100 and actuator cap 130 back towards the distal end of the support shaft 80. This results in the disengagement of the torque member 100 and drive member 82.

Figure 7:
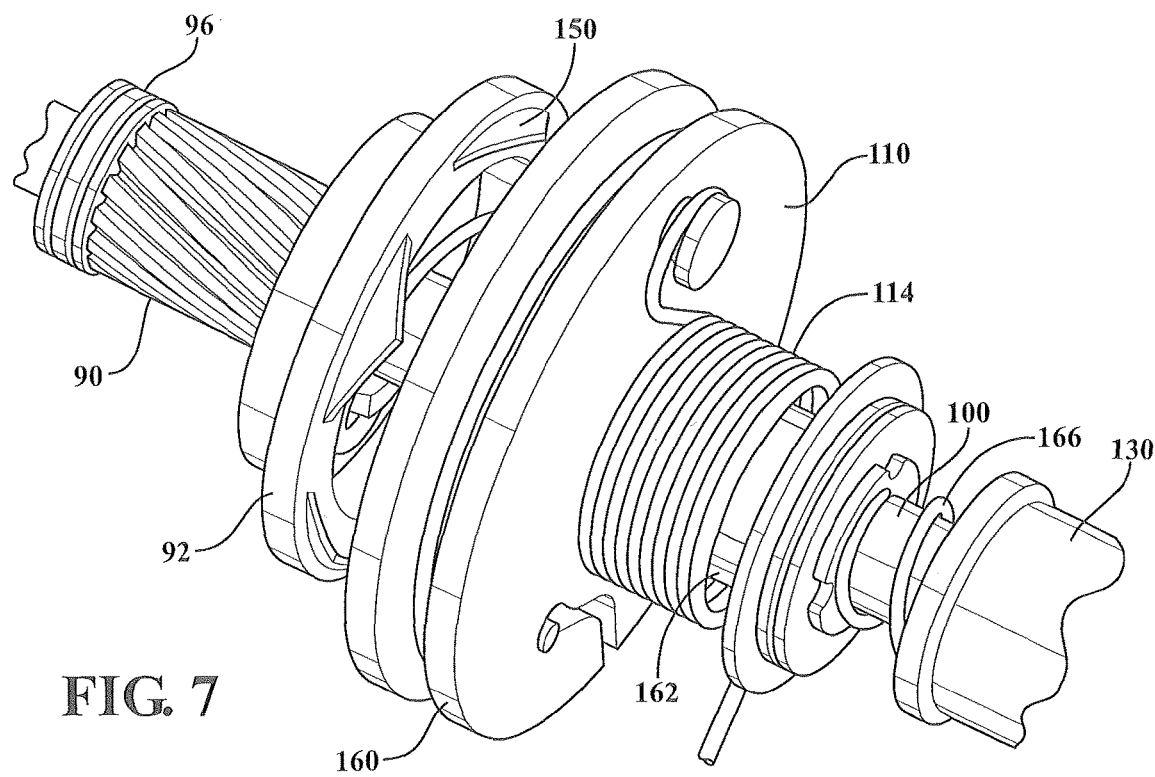
FIG. 7 is a partial perspective view of another embodiment of a cable draw assembly according to one embodiment of the present disclosure.
Figure 8:
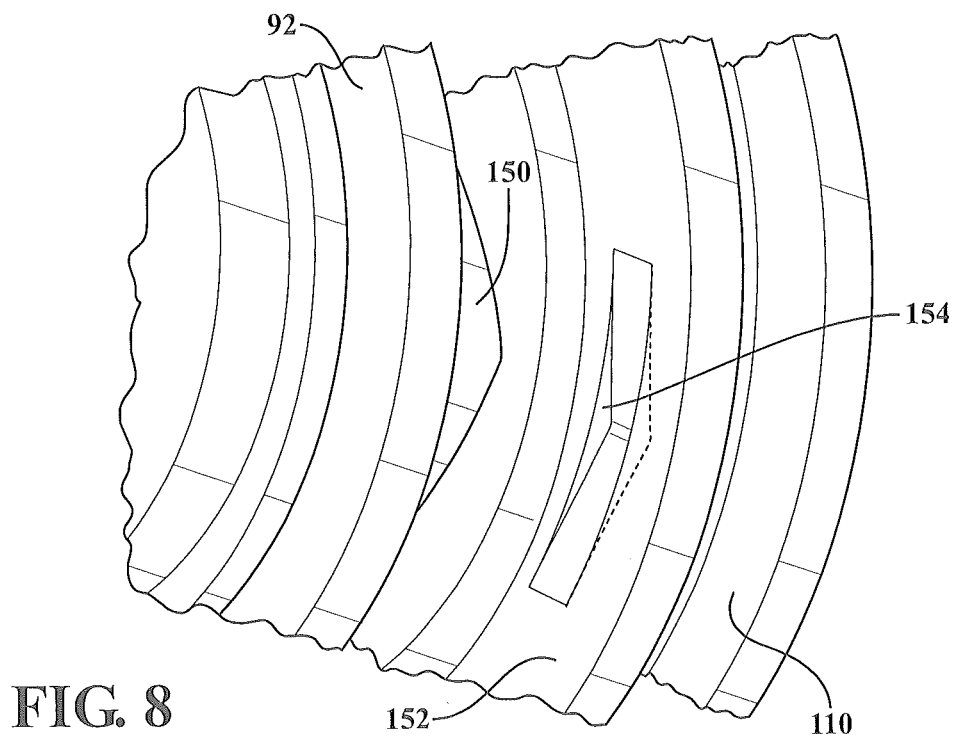
FIG. 8 is a enlarged perspective view of a portion of FIG. 7.
Figure 9:
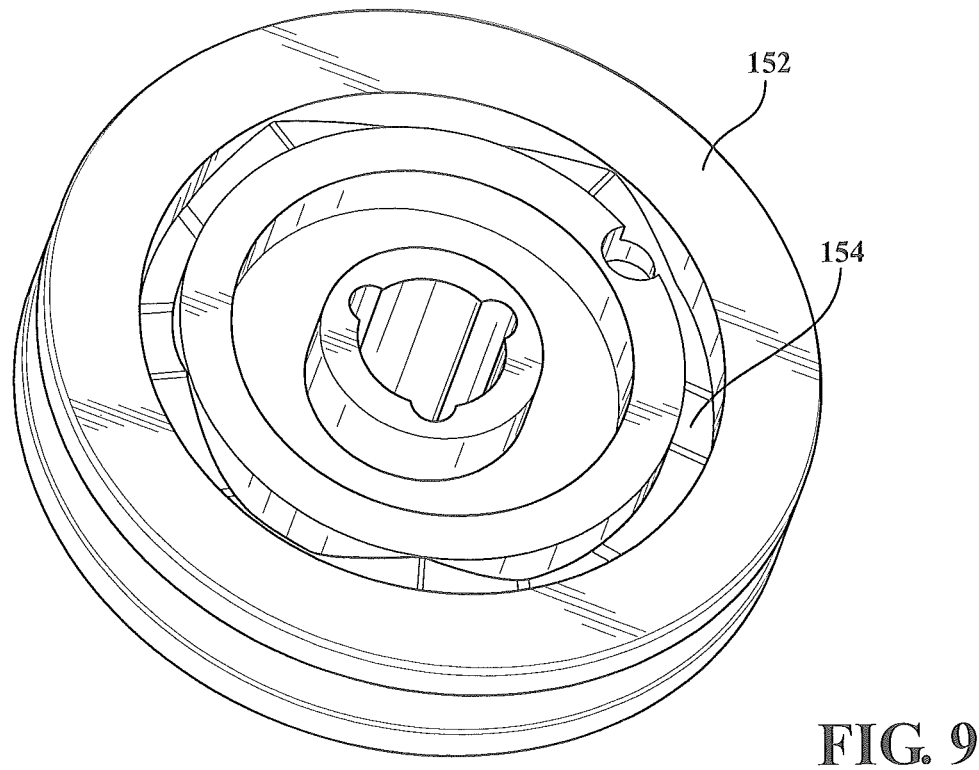
FIG. 9 is a side view of a cable drum of the cable draw assembly FIGS. 7 and 8.
Figure 10:
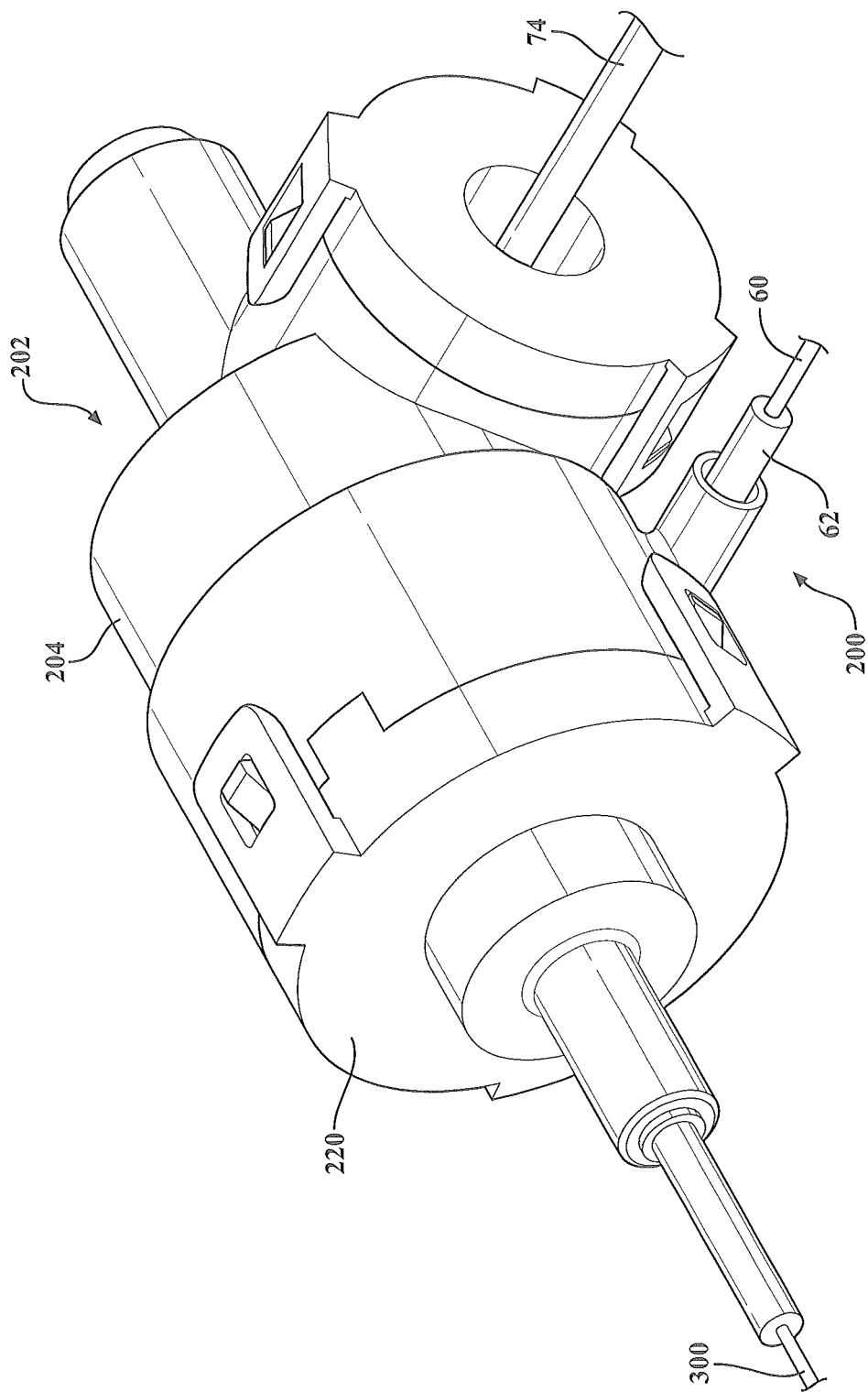
FIG. 10 is a side perspective view of another embodiment of a cable draw assembly for a power return mechanism of the present disclosure.

FIGS. 7-9 illustrate a variation of the power return mechanism 50. The power return mechanism 50 includes the components described above but instead of a friction pad 116, the torque limiter is achieved with a set of teeth 150 which are configured around an outer circumference of the flanged portion 92 of the drive member 82. The teeth 150 of the drive member 82 extend towards a facing outer surface 152 of the return cable drum 110. Corresponding notches 154 are defined around a circumference of the outer surface 152 of the return cable drum 110. The teeth 150 and notches 154 are configured with cammed profiles. When the power return mechanism 50 is actuated, the outer surface 152 of the return cable drum 110 comes into contact with the flanged portion 92 of the drive member 82 due to the lateral translation of the torque member 100. Instead of overcoming frictional resistance to allow the return cable drum 110 to slip, the cammed profiles of teeth 150 of the drive member 82 will slide or cam out of the corresponding notches 154 in the return cable drum 110, thereby limiting torque on the return cable drum 110. This configuration reduces the chances of a premature slip of the return cable drum 110 due to oil or grease contacting the friction pad 116 or excessive wear of friction pad 116. Additionally, if the power return mechanism 50 and upper rails 20 have stopped moving due to an obstruction, the drive member 82 will continue to rotate and cause a clicking noise as the teeth 150 of the drive member 82 cam out of or slip past the notches 154 of the return cable drum 110. This noise may alert the user to a situation where, even though the seat assembly 10 has stopped moving, it is not locked and ready or safe for the user to occupy the seat. A clicking noise also may be generated as the seat assembly 10 operates normally, reaches the passenger use position, and is locked. As noted above, this delay and any corresponding clicking noise is typically on the order of a second or less than a second.

FIG. 7 also illustrates a further variation of the return cable drum 110. The return cable drum 110 includes a first guide portion 160 to retain the return cable 60 and a second longitudinal portion 162 which extends axially towards the distal end of the support shaft 80. The first guide portion 160 and second longitudinal portion 162 are rotatably supported by the torque member 100. The cable tension means 114 is mounted to the second longitudinal portion 162 instead of being mounted directly over the torque member 100. The second longitudinal portion 162 includes a thrust bearing 164 which is mounted adjacent to a retainer bearing surface 166 by a retainer clip 168. An additional return bias means 170 may be provided between the modified return cable drum 110 and the actuator cap 130.

FIGS. 10-17 illustrate another embodiment of a return power mechanism 200 according to the present disclosure. The return power mechanism 200 includes a return cable assembly 52 and a cable draw assembly 202. The cable draw assembly 202 is contained in a housing 204 which may be connected to the seat track assembly via through the motor assembly 72 and a support rod 74, as described above. The cable draw assembly 202 includes a varied arrangement of components wherein upon actuation of the cable draw assembly 202 causes a drive member 210 to move axially along a support shaft 212 and engage a torque member 214, thereby causing rotation of a return cable drum 216.

Specifically, the longitudinal support shaft 212 supports an actuator cap 218 at a proximal end of the support shaft 212. A distal or rear end of the support shaft 212 may be press fit or molded onto a rear portion 220 of the housing 204. The support shaft 212 supports the drive member 210 adjacent the cap 220. The drive member 210 is rotatable about and coaxial with the support shaft 212. A bearing 224 may be mounted between the actuator cap 218 and the drive member 210. In one embodiment, the drive member 210 includes a first geared portion 226 at its proximal end, a second flanged portion 228 its distal end, and a middle inset or non-geared portion 230 between the geared portion 226 and the flanged portion 228. The drive member 210 is selectively coupled with an adjacent drive assembly 240 during actuation of the return power mechanism 200. As shown in the first position of FIGS. 11, 12, and 14, when the return power mechanism 200 is not actuated, the middle portion 230 of the drive member is adjacent a geared portion 242 of the drive assembly 240. As shown in the second position of FIGS. 13 and 15, when the return power mechanism 200 is actuated, the drive member 210 is moved axially along the support shaft 212 and the geared portion 226 of the drive member 210 engages the geared portion 242 of the drive assembly 240. Thus, the drive member 210 only rotates when the return power mechanism 200 is actuated.

As shown in FIGS. 14-17, the flanged portion 228 defines a cavity which receives a portion of the torque member 214, as described below. One or more teeth or fingers 246 may extend within the cavity for mating or engaging with corresponding teeth or fingers of the torque member. In one embodiment, the fingers 246 extend from a center portion of the drive member 210 such that the flanged portion 228 and fingers 246 define a generally annular space for receiving the torque member 214.

The torque member 214 is rotatably mounted to and coaxial with the support shaft 212. In this embodiment, the torque member 214 is fixed axially along the support shaft 212 adjacent to the drive member 210. The torque member 214 includes first and second longitudinal portions 250, 252. A plate 254 extends outward from the torque member 214 transverse to the longitudinal axis of the support shaft 212. The plate 254 may extend outward at the transition between the first and second longitudinal portions 250, 252 or at another position on the first longitudinal portion 250. As shown in FIGS. 14-17, the first longitudinal portion 250 has a larger circumference than the second longitudinal portion 252. The first longitudinal portion 250 defines a cavity for receiving the fingers 246 of the drive member 210. Specifically, one or more fingers 256 are defined within the cavity of the torque member 214 for receiving and engaging with the fingers 246 of the drive member 210. A return bias means 260 is provided within the cavity of the torque member 214 to push the drive member 210 axially along the support shaft 212 and away from the torque member 214 when the power return mechanism 200 is deactivated. In one embodiment, the return bias means 260 is a compression spring. A bearing 262 is located between the torque member 214 and the support shaft 212.

Figure 11:
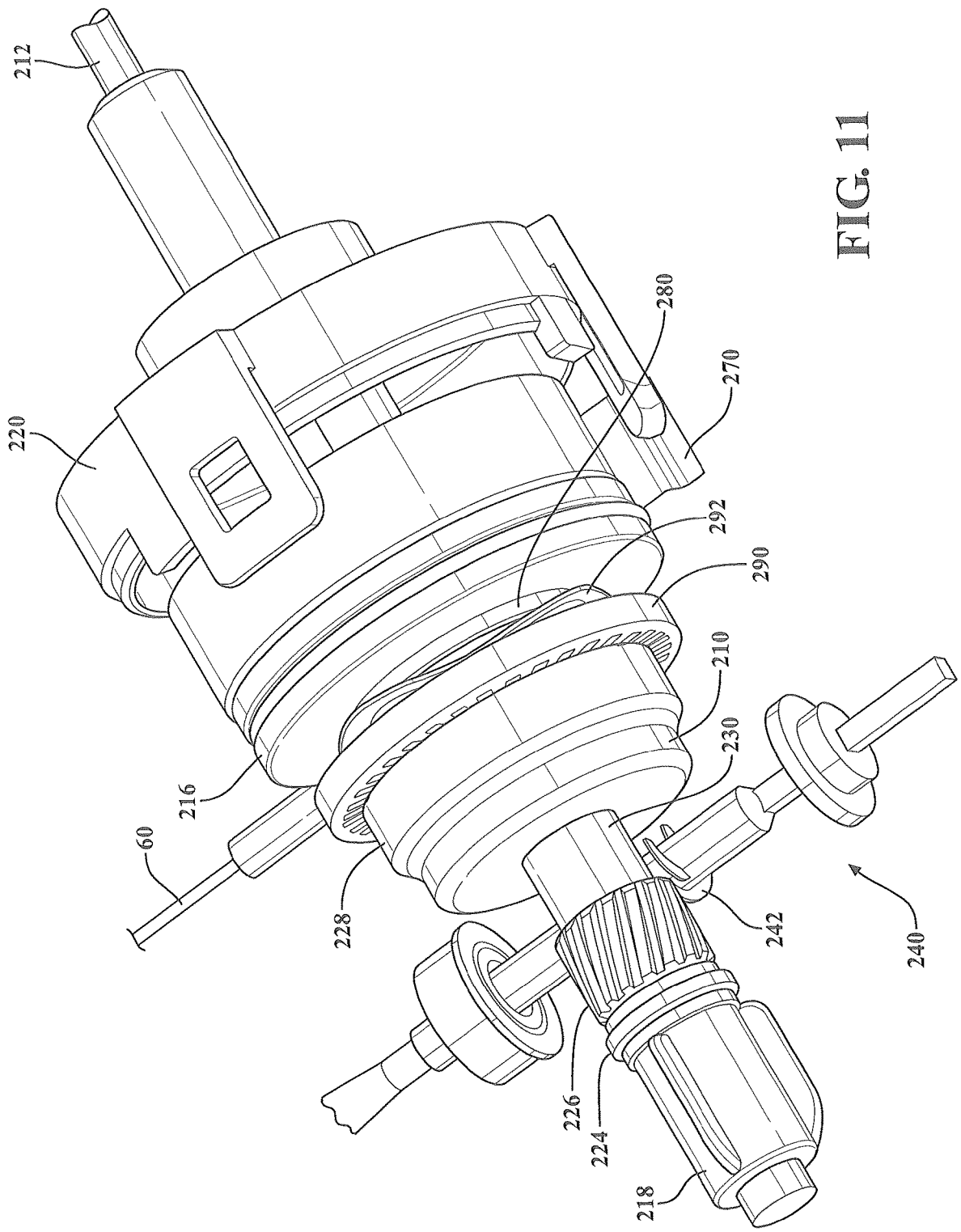
FIG. 11 is a rear perspective view of the cable draw assembly of FIG. 10 in a first position with a portion of the housing removed.
Figure 12:
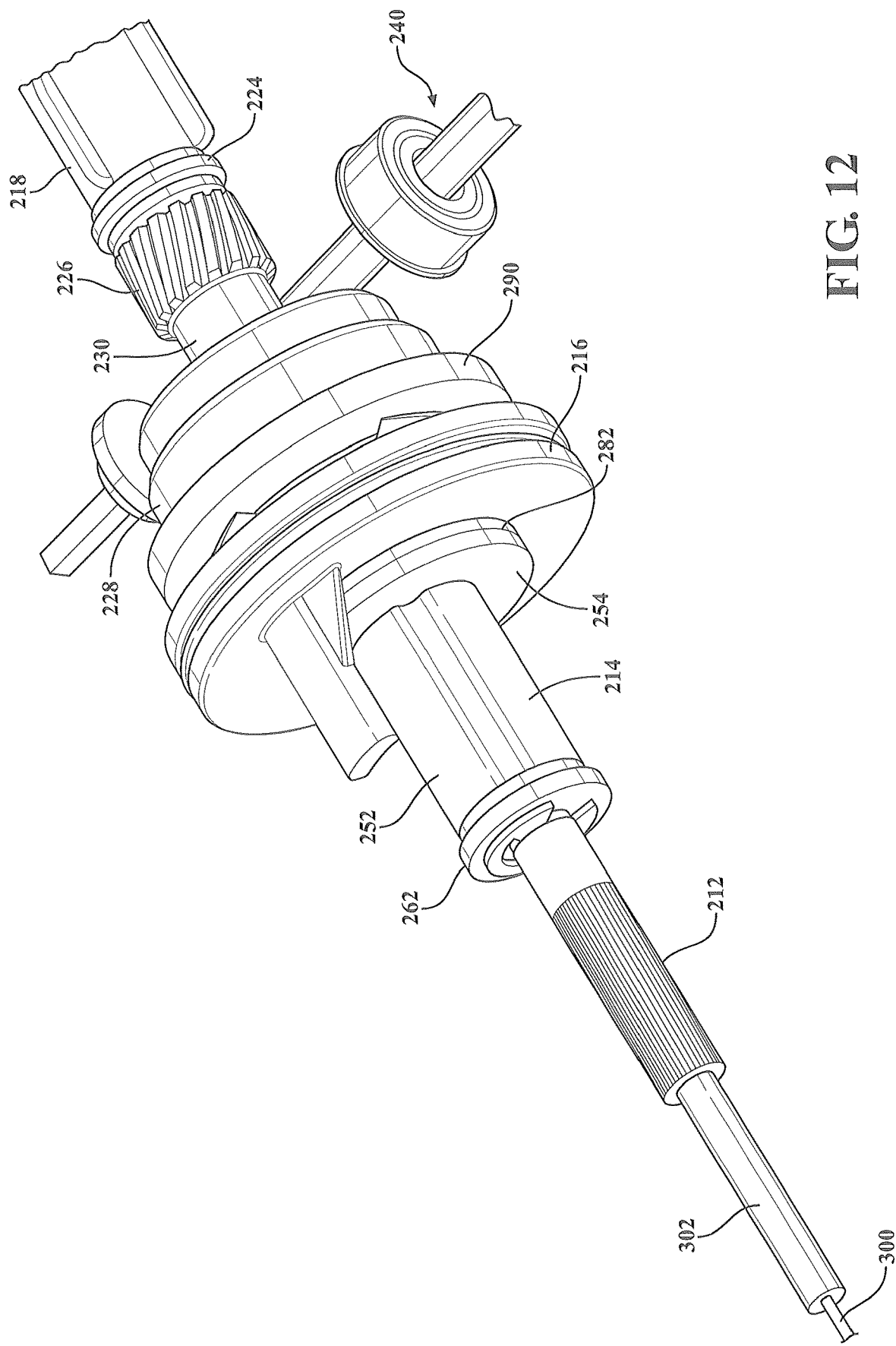
FIG. 12 is a front perspective view of the cable draw assembly of FIG. 10 in the first position with all portions of the housing removed and the cable tension spring removed.
Figure 13:
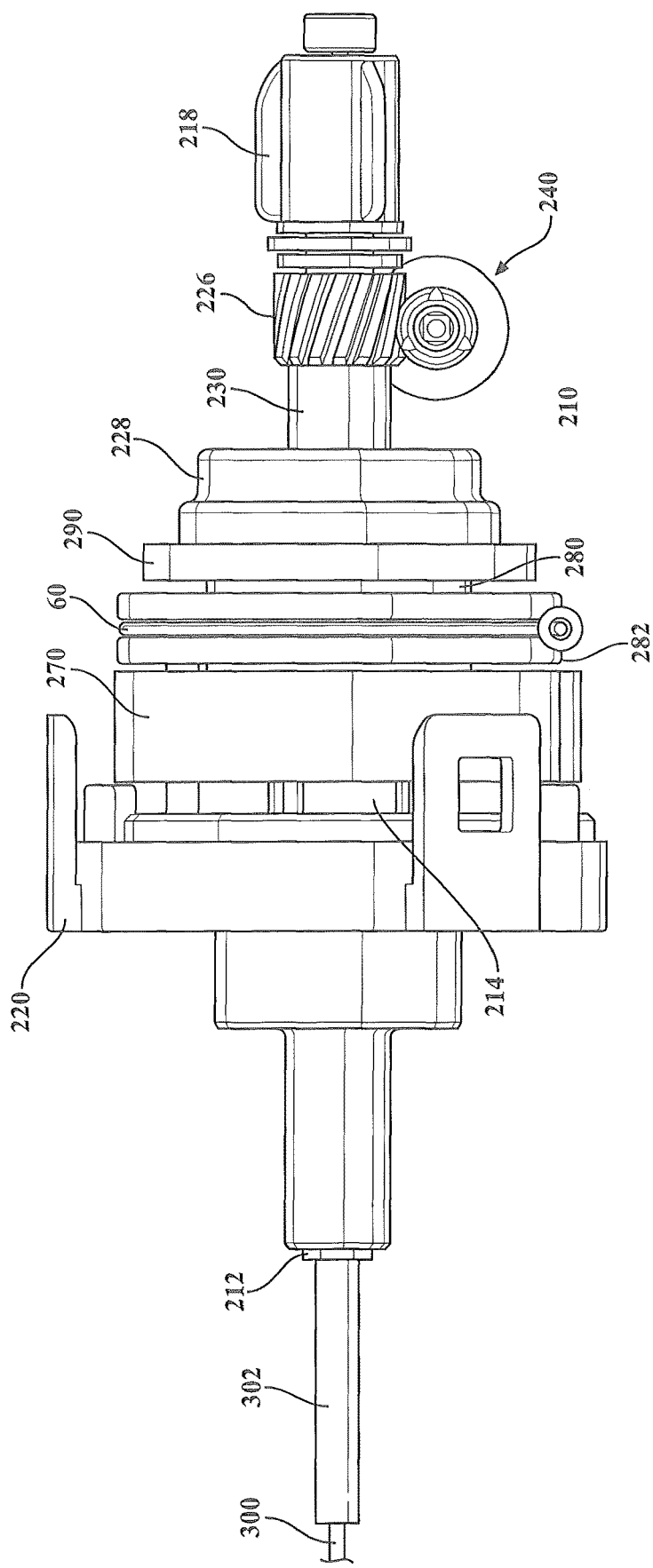
FIG. 13 is a side view of the cable draw assembly of FIG. 10 in a second position.
Figure 14:
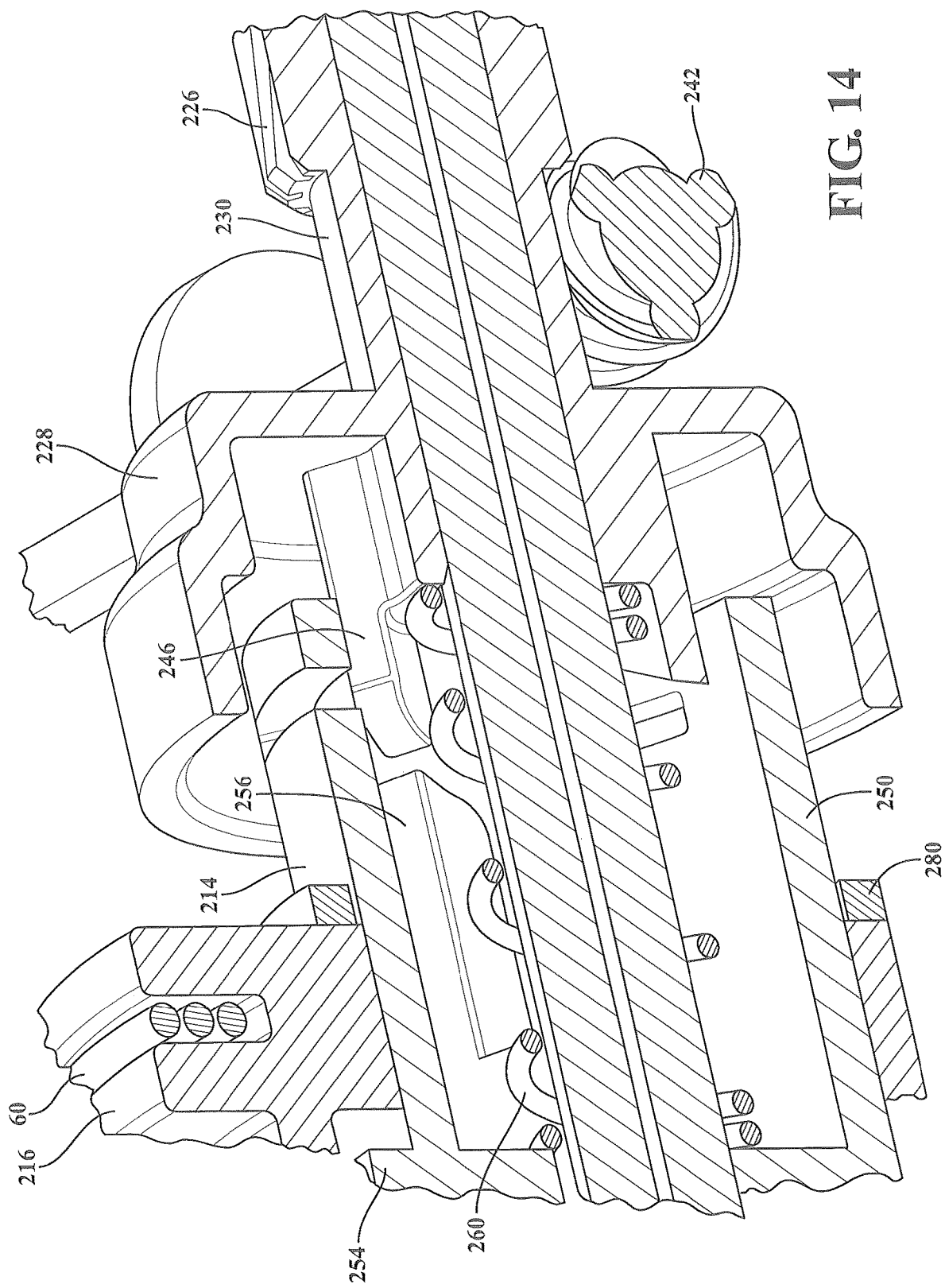
FIG. 14 is a perspective view of a cross-section of a portion of the cable draw assembly in the first position.
Figure 15:
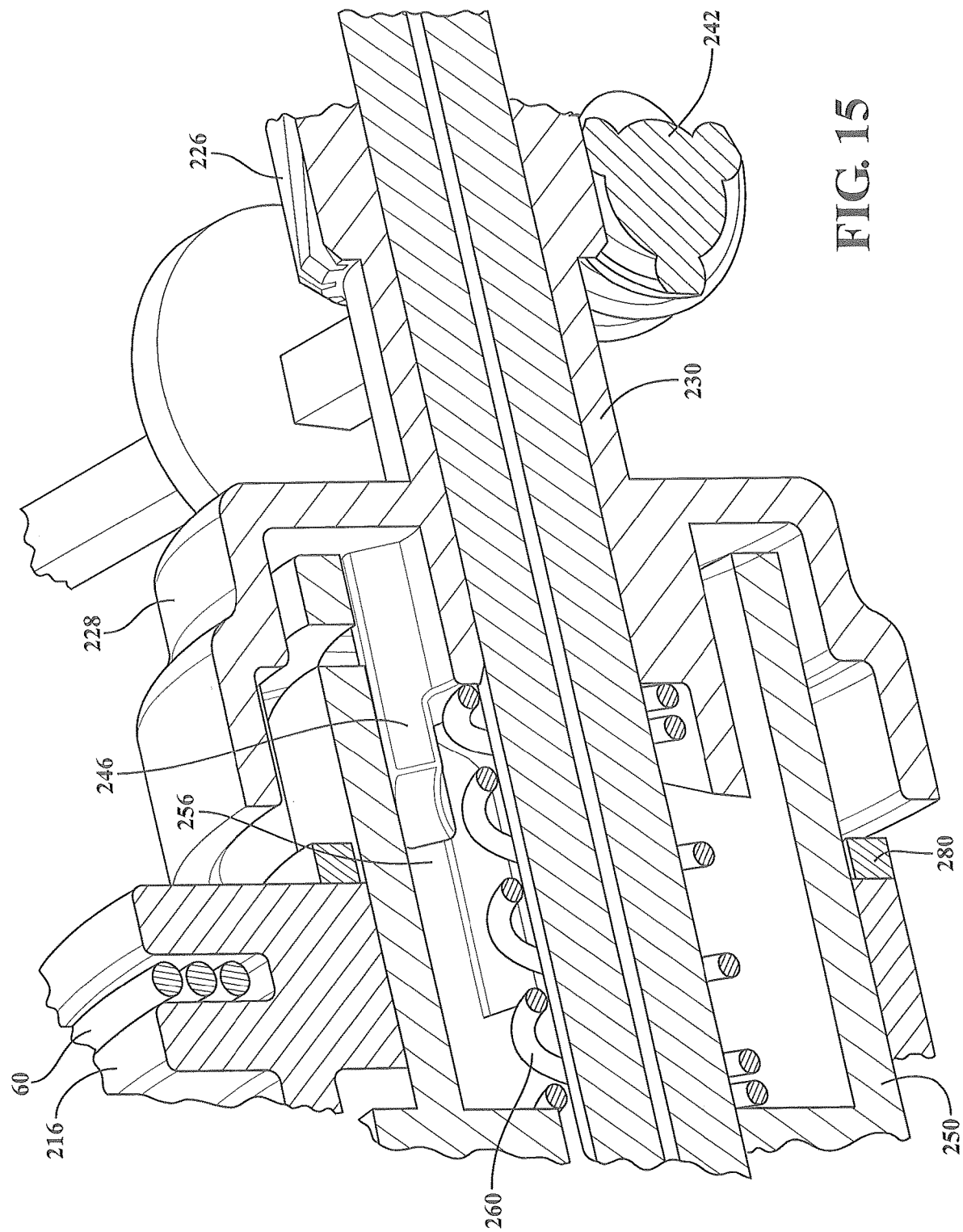
FIG. 15 is a perspective view of a cross-section of a portion of the cable draw assembly in the second position.
Figure 16:
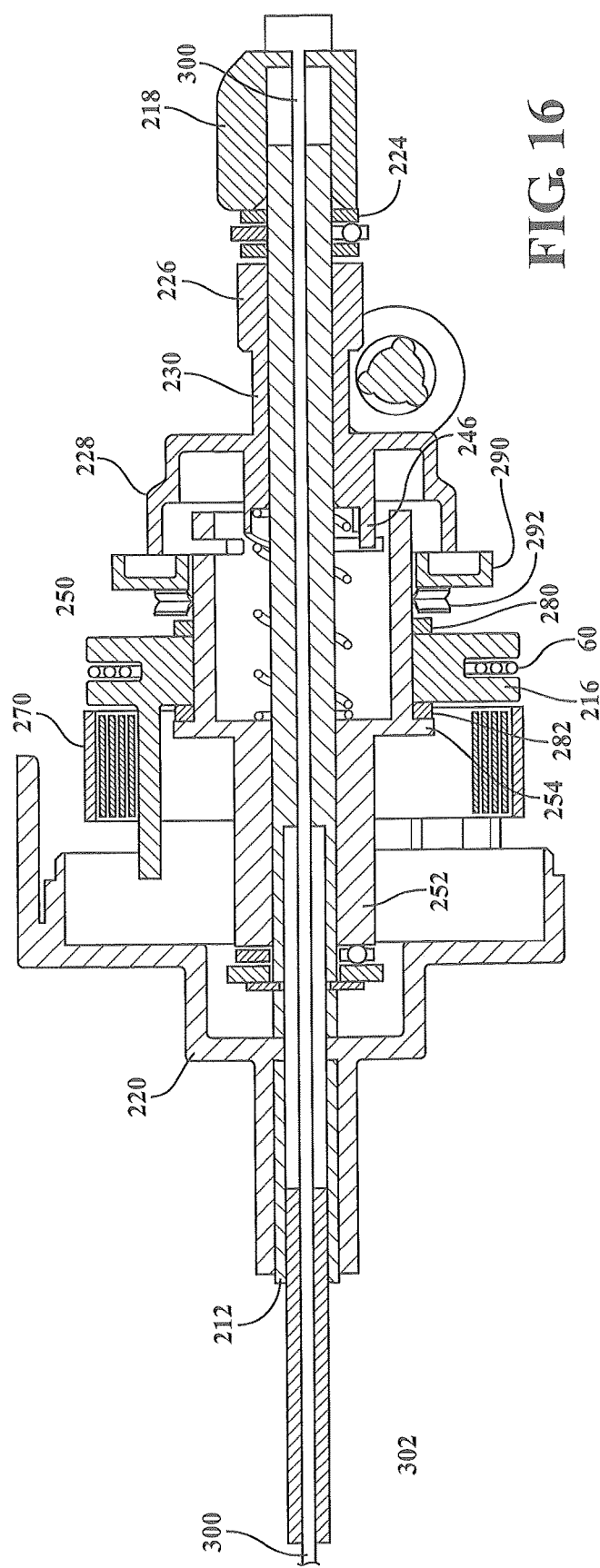
FIG. 16 is a side view of a cross-section of the cable draw assembly of FIG. 12.
Figure 17:
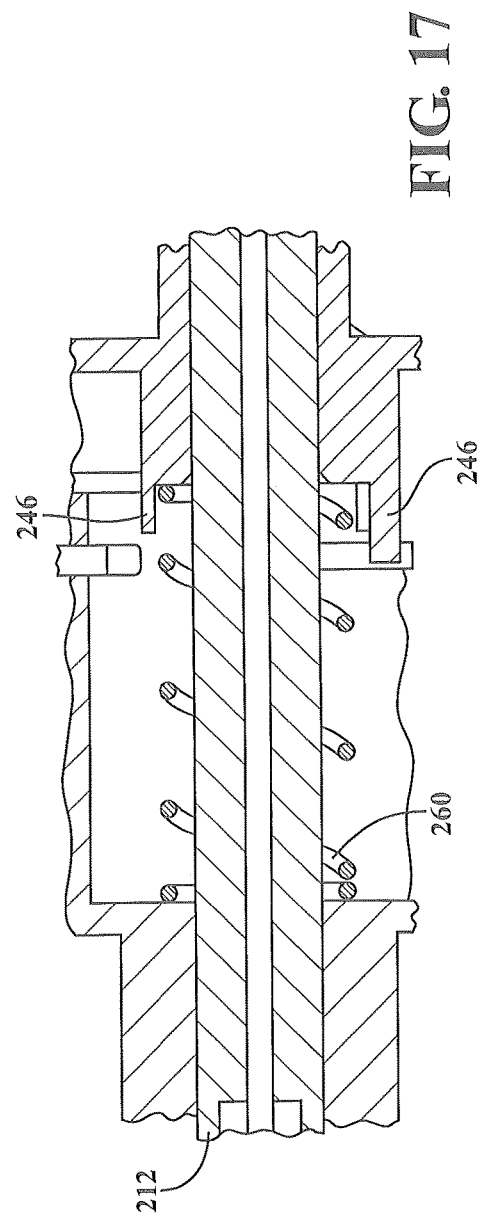
FIG. 17 is an enlarged view of a portion of FIG. 16.

The return cable drum 216 is mounted to and coaxial with the torque member 214. In one embodiment, the return cable drum 216 is mounted to the torque member 214 adjacent to the plate 254 and specifically, on the side of the plate 254 facing the drive member 210. During regular operation of the seat assembly 10, the return cable drum 216 rotates freely and independently of the torque member 214 and drive member 210. A cable tension means 270, as shown in FIGS. 11, 13 and 16, is connected to return cable drum 216 and to the rear portion 220 of the housing 204 to ensure that the return cable 60 is pulled back in during regular operation and rearward seat travel when the power return mechanism 200 is not actuated. The cable tension means 270 may be any suitable bias means such as a clock spring or expansion spring.

In the embodiment shown in FIGS. 10-17, the torque limiter consists of two friction pads. A first friction pad 280 is mounted to the first longitudinal portion 250 of the torque member 214 on one side of the return cable drum 216, facing the drive member 210. A second friction pad 282 is also mounted to the first longitudinal portion 250 of the torque member 214, between the plate 254 and the opposite side of the return cable drum 216.

Similar to the operation described above, when the power return mechanism 200 is actuated, the drive member 210 is moved axially along the support shaft 212 and engages the drive assembly 240 and the torque member 214, thereby rotating the drive member 210 and torque member 214. The drive member 210 also connects with the return cable drum 216 through the friction pads 280, 282. The return cable drum 216 rotates and draws in the return cable 60, thus moving the upper rail 20 and seat assembly 10 back to the passenger use position. When the seat assembly 10 hits a hard stop, either at the passenger use position or due to an obstruction, the return cable drum 216 slips against the friction pads 280, 282 and is prevented from rotating or attempting to rotate further as the frictional force on the return cable drum 216 is overcome by the increased tension in the return cable 60.

In one embodiment, the cable draw assembly 202 includes a pressure plate 290 and a pressure plate spring 292 between the first friction pad 280 and the flanged portion 228 of the drive member 210. The pressure plate 290 presses the pressure plate spring 292 against the friction pad 280. The pressure plate 290 and pressure plate spring 292 are illustrated in FIGS. 11-13 and 16-17 but are omitted from FIGS. 14-15.

The cable draw assembly 202 includes an actuator assembly which consists of the actuator cap 218, an actuator cable 300, and actuator cable conduit 302. In one embodiment, the actuator cable 300 extends from the actuator cap 218 at the proximal end of the support shaft 212 and through a central bore in the support shaft 212. The actuator cable 300 leaves the cable draw assembly 202 through the distal end of the support shaft 212 and the rear portion 220 of the housing 204. Upon actuation of the power return mechanism 200 through a user input such as a button, handle or lever, the actuator cable 300 is pulled to draw the actuator cap 218 and drive member 210 towards the distal end of the support shaft 212, thus engaging the drive member 210 with the drive assembly 240 and torque member 214 as described above.

Once the seat assembly is locked into position, the power return mechanism 200 is deactivated by removing the force in the actuator cable 300. The return bias means 260 between the torque member and drive member 210 pushes the drive member 210 axially towards the proximal end of the support shaft 212. The drive member 210 stops rotating as the middle portion 230 of the drive member 210 moves over the geared portion 242 of the drive assembly 240. If the drive member 230 cannot reset to its return or deactivated position due to the interface between the geared portion 226 and the drive assembly 240, it will reset once the drive assembly 240 begins rotation for other functions, such as regular power seat adjustment.

Figure 18A:
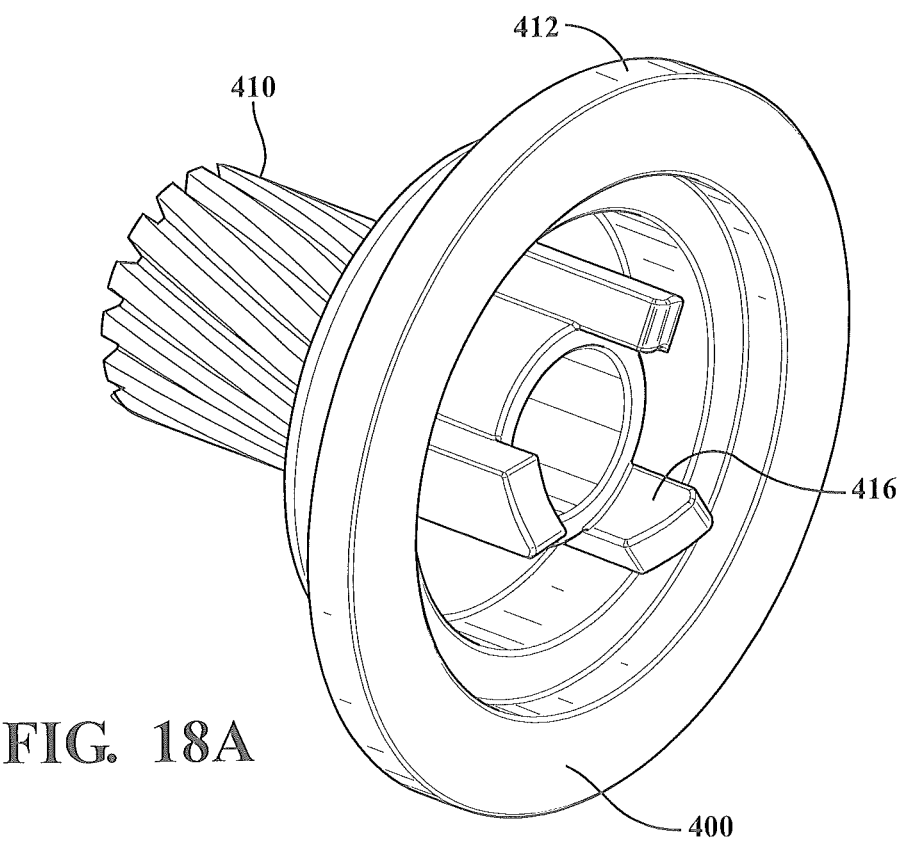
FIGS. 18A and 18B are front and rear perspective views of a variation of the drive member for the cable draw assembly of FIGS. 7-9.
Figure 18B:
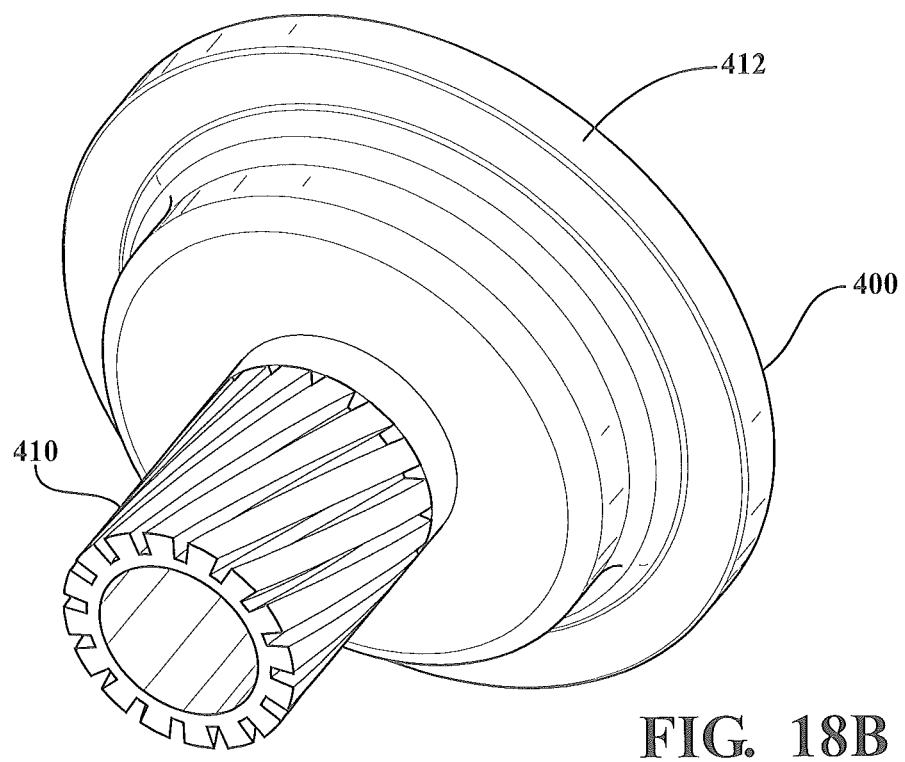
Figure 19A:
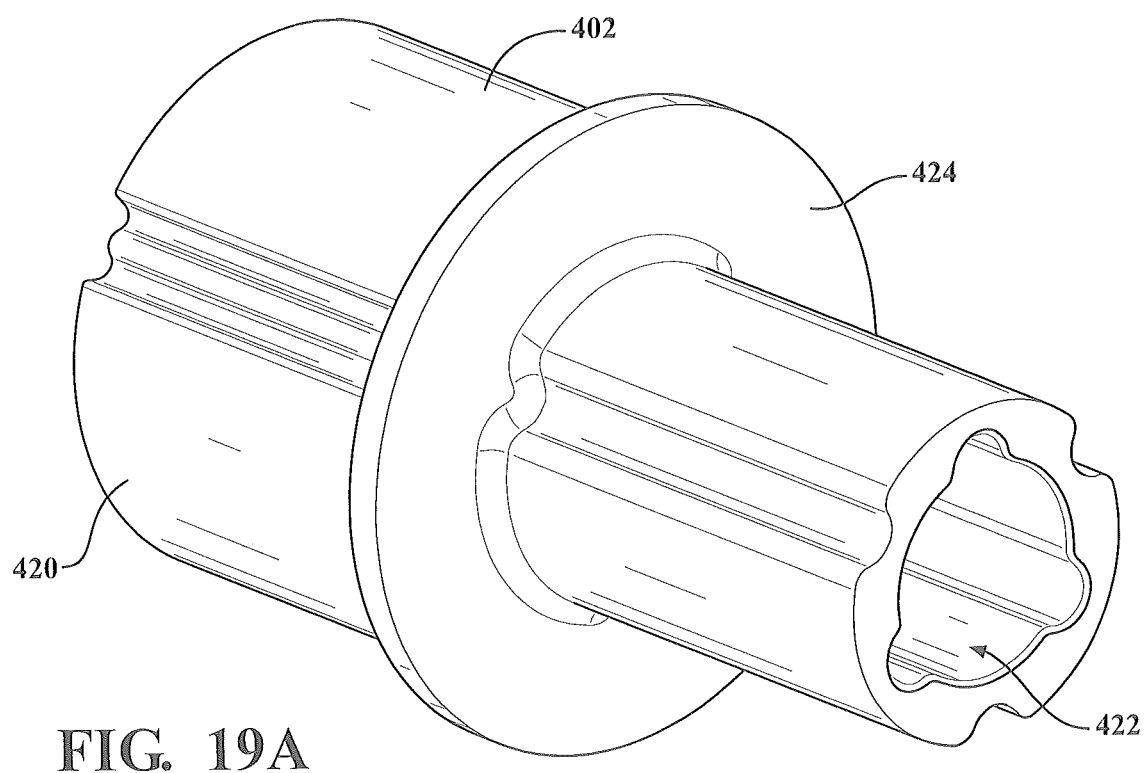
FIGS. 19A and 19B are front and rear perspective views of a variation of the torque member for the cable draw assembly of FIGS. 7-9.
Figure 19B:
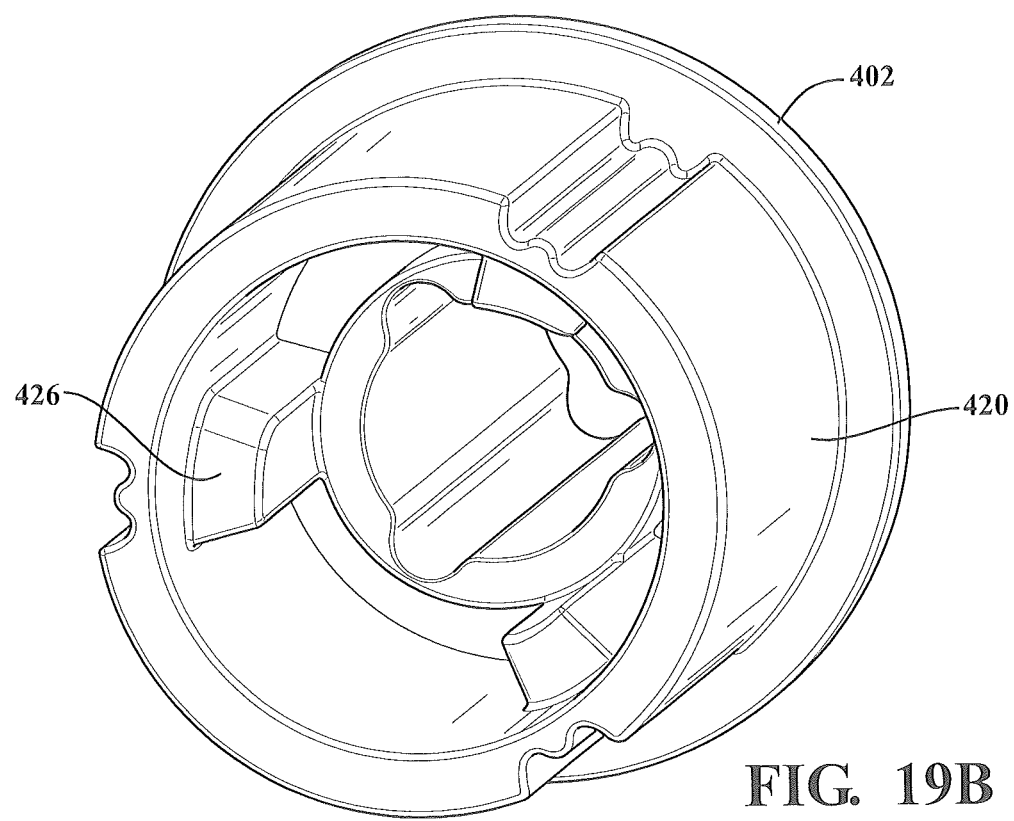

FIGS. 18-19 illustrate a further variation of a drive member 400 and torque member 402 for the cable draw assembly 54 illustrated in FIGS. 1-9. The drive member 400 includes a geared portion 410 and a flanged portion 412. The flanged portion 412 defines a cavity which receives a portion of the torque member 402. Multiple teeth or fingers 416 extend within the cavity, parallel to the longitudinal axis of the support shaft 212.

The torque member 402 has first and second longitudinal portions 420, 422. A plate 424 extends outward from the torque member 402 transverse to the longitudinal axis of the support shaft 212. The plate 424 may extend outward at the transition between the first and second longitudinal portions 420, 422 or at another position on the first longitudinal portion 420. The first longitudinal portion 420 has a larger circumference than the second longitudinal portion 422. The first longitudinal portion 420 defines a cavity for receiving the fingers 416 of the drive member 400. One or more fingers 426 are defined within the cavity of the torque member 214 for receiving and engaging with the fingers 416 of the drive member 400.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power return mechanism for restoring an upper rail of a seat track assembly for a vehicle from a first position to a second position relative to a lower rail of the seat track assembly, the upper rail being slidably coupled with the lower rail, the power return mechanism comprising:
    a return cable assembly having a return cable adapted to be fixedly secured to one of the upper rail or the lower rail of the seat track assembly;
    a selectively actuated cable draw assembly adapted to be connected to the other of the upper rail or the lower rail of the seat track assembly and operatively coupled with the return cable assembly, the cable draw assembly permitting free movement of the return cable when the cable draw assembly is inactive, and when actuated, the cable draw assembly draws in the return cable, thereby moving the upper rail of the seat track assembly from the first position to the second position;
    a support shaft having a longitudinal axis;
    a drive member coaxial with the support shaft and rotatably mounted to a proximal end of the support shaft;
    a torque member coaxial with and rotatably mounted to the support shaft, the torque member being mounted adjacent to the drive member; and
    a return cable drum coaxial with and rotatably mounted to the torque member, the return cable drum holding and guiding the return cable of the return cable assembly; and
    wherein when the cable draw assembly is actuated, the torque member engages and rotates with the drive member, thereby causing the return cable drum to rotate and draw in the return cable.

2. The power return mechanism of claim 1 wherein the first position comprises a forward position and where in the second position comprises an aft position.

3. The power return mechanism of claim 2 wherein the first position comprises a full forward position of the seat track assembly.

4. The power return mechanism of claim 1 wherein the drive member comprises a geared portion adjacent a proximal end of the shaft and a flanged portion adjacent the torque member, a surface of the flanged portion facing the torque member having multiple teeth for engaging corresponding teeth on a surface of the torque member.

5. The power return mechanism of claim 1 wherein the torque member comprises a plate extending outward from the torque member and transverse to the longitudinal axis of the support shaft, and wherein the return cable drum is mounted to the torque member between the plate and the drive member.

6. The power return mechanism of claim 5 wherein the drive member comprises a geared portion adjacent a proximal end of the shaft and a flanged portion adjacent the torque member and wherein the torque limiter comprises multiple teeth extending from a surface of the flanged portion facing the return cable drum and corresponding recesses defined in a surface of the return cable drum facing the flanged portion of the drive member.

7. The power return mechanism of claim 1 wherein the cable draw assembly further comprises a torque limiter between the drive member and the return cable drum, the torque limiter permits rotation of the return cable drum to stop as tension on the return cable overcomes friction forces on the return cable drum.

8. The power return mechanism of claim 7 wherein the torque limiter comprises a friction pad mounted to the support shaft.

9. The power return mechanism of claim 8 further comprising a second friction pad mounted between the torque member and the return cable drum.

10. The power return mechanism of claim 1 further comprising a drive assembly operatively coupled with the drive member.

11. The power return mechanism of claim 10 wherein the drive member comprises a worm gear and wherein the drive assembly comprises a worm shaft adapted to be coupled to a motor.

12. The power return mechanism of claim 10 further comprising an actuator assembly coupled to the torque member, wherein actuation of the actuator assembly forces lateral translation of the torque member towards the drive member.

13. The power return mechanism of claim 1 further comprising a drive assembly selectively coupled with the drive member.

14. The power return mechanism of claim 13 wherein the drive member comprises a worm gear and wherein the drive assembly comprises a worm shaft adapted to be coupled to a motor.

15. The power return mechanism of claim 13 further comprising an actuator assembly coupled to the drive member, wherein actuation of the actuator assembly forces lateral translation of the drive member towards a distal end of the support shaft, for the drive member to couple with the drive assembly and engage the torque member.

16. The power return mechanism of claim 1 further comprising a return bias means between the drive member and torque member to separate the drive member and torque member upon deactivation of the power return mechanism.

17. The power return mechanism of claim 1 further comprising:
    a housing containing the cable draw assembly, the housing defining a slot for receiving the return cable assembly; and
    a cable bias means extending from the housing to the return cable drum to provide tension for the draw of the return cable when the power return mechanism is deactivated.

18. The power return mechanism of claim 17 wherein the return cable assembly comprises a conduit extending from the cable draw assembly and secured to the upper rail at a first attachment point, the return cable extending from the conduit and secured to the lower rail at a second attachment point, and wherein the cable draw assembly is fixedly secured to the upper rail.

\* \* \* \* \*